(12) United States Patent
Cao et al.

(10) Patent No.: US 6,785,291 B1
(45) Date of Patent: Aug. 31, 2004

(54) APPARATUS AND METHOD FOR CHANNEL ASSIGNMENT OF PACKET FLOWS

(75) Inventors: Carl F. Cao, Nepean (CA); Yajun Liu, Nepean (CA); Maiyuran Wijayanathan, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 739 days.

(21) Appl. No.: 09/672,819

(22) Filed: Sep. 29, 2000

(51) Int. Cl.[7] ............................................. H04L 12/28
(52) U.S. Cl. ..................................... 370/431; 370/468
(58) Field of Search ................................. 370/229, 230, 370/230.1, 235, 395.2, 395.21, 395.4, 395.41, 395.42, 395.43, 431, 468, 465, 412, 428, 429

(56) References Cited

U.S. PATENT DOCUMENTS

| | | | | |
|---|---|---|---|---|
| 4,914,650 A | * | 4/1990 | Sriram | 370/235 |
| 4,980,886 A | * | 12/1990 | Bernstein | 370/433 |
| 5,610,921 A | * | 3/1997 | Christensen | 370/395.4 |
| 5,748,629 A | * | 5/1998 | Caldara et al. | 370/389 |
| 5,940,397 A | * | 8/1999 | Gritton | 370/412 |

* cited by examiner

Primary Examiner—Ajit Patel

(57) ABSTRACT

A technique for dynamically assigning a packet flow to transmission channels can result in more efficient use of the channels when compared to static assignment techniques. Using this technique for dynamic assignment, an initial channel assignment is made based upon a channel specification corresponding to a flow classification indication within the first packet of the flow. Subsequently, the flow classification indications of further packets within the flow are monitored for changes. If it is detected that a flow classification indication has changed when compared to the previous flow classification indication, it is determined whether the previous channel assignment satisfies a channel specification corresponding to the new flow classification indication. If it is determined that the previous channel does not satisfy this new channel specification, a modified channel assignment is generated for the subsequent packets of the flow. The utilization efficiency of transmission channels when transmitting packet flows is important, especially if the packet flows are traversing wireless transmission channels. The use of dynamic assignment of channels for packet flows can significantly increase this efficiency if the flow classification of the packet flow is modified before completion.

29 Claims, 5 Drawing Sheets

APPARATUS AND METHOD FOR CHANNEL ASSIGNMENT OF PACKET FLOWS

FIELD OF THE INVENTION

This invention relates generally to packet flows and, in particular, to apparatus and methods used for channel assignment of packet flows.

BACKGROUND OF THE INVENTION

A packet flow can be defined by one of a number of different classes depending upon the particular characteristics of the flow. Flows of these different classes have corresponding differences in transmission requirements with respect to Quality of Service (QoS). As described herein below with reference to FIGS. 1A and 1B, it can be seen that flows of these different classes further have differences with respect to channel bandwidth requirements.

FIG. 1A is a graphical depiction comparing channel speed (directly related to channel bandwidth) in kilobits per second (kbps) to channel utilization in percent, for a number of flows of different flow classifications, classes 1 through 4 in this example. For this example, classes 1 to 4 each have different resource requirements, the resource requirements increasing from class 1 through to class 4. As can be seen in FIG. 1A, no matter what the class of the flow, at low channel speeds, the channel utilization will be close to 100%. When a class 4 flow is sent along channels of increasingly large channel speed, the channel utilization remains virtually at 100% as each additional increase in channel speed is used to decrease the time of transmission for the flow. For flows of classes 1 through 3 with lower resource requirements, it can be seen that the channel utilization decreases as the channel speed increases. Hence, if a channel of a large channel speed is selected for a flow of class 1, 2 or 3, the efficiency of use for this channel would be low.

FIG. 1B is a graphical depiction comparing channel speed in kbps with channel throughput in kbps, for a number of flows of different classifications, the classes 1 through 4 described in the above example. In this figure, it can be seen that for a class 4 flow, as the channel speed increases, the channel throughput increases at a corresponding rate. By comparison, although a class 3 flow has a channel speed and channel throughput characteristic similar to a class 4 flow at low channel speeds, as the channel speed for a class 3 flow increases beyond a threshold level, the channel throughput virtually levels off and only marginally increases as the channel speed continues to increase. Similar results can be seen for flows of class 1 or 2, with the threshold level of channel speed at which the increases in channel throughput start leveling off being significantly lower.

Essentially, FIGS. 1A and 1B illustrate the importance of having the proper channel selected for the proper packet flow. If an improper channel is selected, the efficiency of transmission for the flow can be severely jeopardized. For instance, if a channel of high channel speed is selected for a flow with low bandwidth requirements such as a class 1 flow described above, the channel utilization will be low and a significant portion of potential throughput for the channel will be unused. On the other hand, if a channel of low channel speed is used to transmit a flow with high bandwidth requirements such as a class 4 flow described above, the time that it will take to transmit the flow will be significantly increased. This increased time causes the single flow to monopolize the channel for a longer period of time and further decreases customer satisfaction.

Currently, channels are selected for a particular packet flow based upon the flow classification that is assigned to the first packet of the flow, the flow classification of the first packet being determined with use of static characteristics related to this packet. A flow classification technique that utilizes such static characteristics corresponding to the first packet to assign a flow classification to a packet flow is referred to as a static flow classification technique. In this case, the bandwidth requirements of the particular flow as a whole are assumed to be consistent with the bandwidth requirements typical of the flow classification determined with the static is flow classification technique.

Unfortunately, there are situations in which the bandwidth requirements typical of the flow class determined with the static flow classification technique for the first packet of a packet flow is not consistent with the bandwidth requirements for the flow as a whole. These situations include, but are not limited to, cases in which the static characteristics of the first packet cannot be analyzed due to encryption and/or the flow effectively changing in bandwidth requirements after the flow has been assigned to a particular channel. In these situations the standard channel assignment techniques will not always select the best channel for the packet flow or a portion of the flow. An improved channel assignment technique is required that can compensate for these problems. This is particularly important when considering issues applicable to the wireless environment where channel resources are significantly more limited and proper channel utilization becomes critical.

SUMMARY OF THE INVENTION

The present invention is directed to apparatus and methods used for dynamically assigning packet flows to transmission channels. Using the technique of the present invention, an initial channel assignment is made based upon a channel specification that corresponds to a flow classification indication within the first packet of the flow. Subsequently, the flow classification indications of further packets within the flow are monitored for changes. If it is detected that a flow classification indication has changed when compared to the previous flow classification indication, it is determined whether the previous channel assignment satisfies a channel specification that corresponds to the new flow classification indication. If it is determined that the previous channel does not satisfy this new channel specification, a modified channel assignment is generated for the subsequent packets of the flow. The use of dynamic assignment of channels for packet flows can significantly increase the utilization efficiency within transmission channels if the flow classification of the packet flow is modified before completion.

The present invention, according to a first broad aspect, is a computing apparatus arranged to receive a flow of packets, a plurality of the packets having corresponding flow classification indications. The computing apparatus includes a flow classification reader and channel assignment logic. The flow classification reader operates to determine a first flow classification indication associated with a first packet of the flow and at least one subsequent flow classification indication associated with a subsequent packet of the flow. The channel assignment logic operates to assign the flow to a first one of the channels with use of the first flow classification indication, to determine if a change channel test is passed with use of the subsequent flow classification indication and to re-assign the flow to a second one of the channels with use of the subsequent flow classification indication if the change channel test is passed.

According to a second broad aspect, the present invention is a packet transmission system arranged to receive a flow of packets, a plurality of the packets having a corresponding flow classification indication. In this aspect, the packet transmission system includes a plurality of transmission channels along with a flow classification reader and channel assignment logic similar to the first broad aspect.

Preferably, the transmission channels are wireless communication channels. As well, the system further preferably includes a look-up database that lists a plurality of channel specifications that correspond to respective flow classification indications. In this aspect, the channel assignment logic operates to assign the flow to a first one of the channels by determining a first channel specification that corresponds to the first flow classification indication with use of the look-up database and assigning the flow to a channel that achieves the first channel specification. Further, the channel assignment logic operates to re-assign the flow to a second one of the channels by determining a second channel specification that corresponds to the at least one subsequent flow classification indication with use of the look-up database and re-assigning the flow to a channel that achieves the second channel specification.

The present invention, according to a third broad aspect, is a method for dynamically assigning a flow of packets to one of a plurality of channels, a plurality of the packets having corresponding flow classification indications. In this aspect, the method includes a number of steps. Firstly, the method reads a first flow classification indication associated with a first packet of the flow and assigns the flow to a first one of the channels with use of the first flow classification indication. Next, the method reads subsequent flow classification indications associated with subsequent packets of the flow and determines it the assigned first channel for the flow needs to be changed with use of the subsequent flow classification indications. Finally, if the assigned first channel for the flow needs to be changed, the method re-assigns the flow to a second one of the channels with use of the subsequent flow classification indications.

In a yet further aspect, the present invention is a computer readable memory arranged to store a channel assignment software that can be run on a computing apparatus that receives a flow of packets, a plurality of the packets having corresponding flow classification indications. In this aspect, the channel assignment software when running on the computing apparatus operates to perform steps similar to those described for the third broad aspect.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The preferred embodiment of the present invention is described with reference to the following figures, in which.

DETAILED DESCRIPTION OF THE PREFERRED EMBODIMENT

Figure 1A:
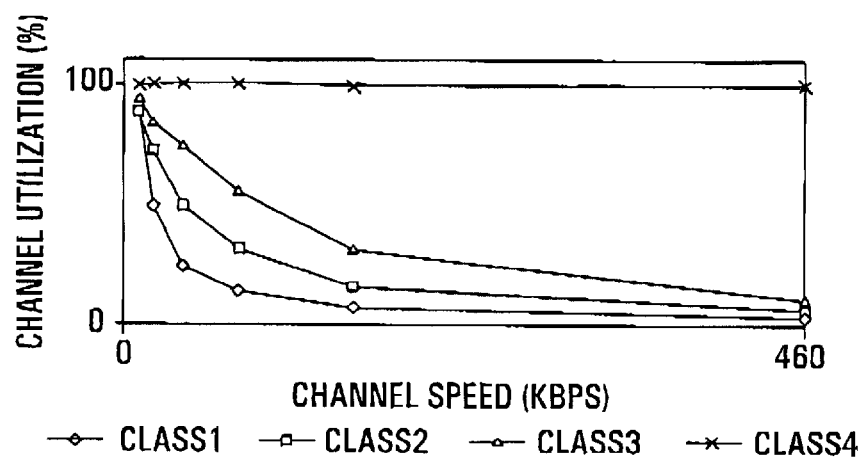
FIG. 1A is a graph that illustrates channel speed compared to channel utilization for a variety of flow classifications.

Embodiments of the present invention are directed to apparatus and methods for channel assignment of a packet flow. The present invention allows for dynamic channel assignment of a packet flow with the combined use of a Flow Class Reader (FCR) for determining a flow classification indication attached to each packet of a flow and Channel Assignment Logic (CAL) for determining a channel for the particular flow classification indication. With the present invention implemented, if a classification for a packet flow changes, so possibly does the channel assignment, thus preferably maintaining a high utilization efficiency.

There are a number of different techniques that have been attempted to classify packet flows appropriately for use in Quality of Service (QoS) decisions. The current most common method of flow classification within industry is referred to as static flow classification, static flow classification being the use of pattern matching with one or more of Layer 3 (L3) through Layer 7 (L7) headers and/or the payload information to decide upon a flow classification for the entire flow, the pattern matching normally being performed only on the first packet of the flow. The advantages of using static flow classification, as currently designed, is the general simplicity of the classification decision process, as well as the satisfactory speed and normal reliability of the decision making procedure.

Unfortunately, there are situations where the reliability of the static flow classification procedure is in question. Some of these situations include: during the use of Layer 7 (L7) protocols in non-default applications; during the use of non-standard Layer 4 (L4) port numbers; when the class of the packet flow is dynamically changing; and where the different headers of the packet are encrypted. In fact, when the packets of the flow are encrypted, the static flow classification technique is not useable and another technique for flow classification must be used.

Another technique for classification of flows that can be utilized is dynamic flow classification as is disclosed within U.S. Pat. No. 6,023,456 entitled "Dynamic Traffic conditioning" by Chapman et al, assigned to the assignee of the present invention and herein incorporated by reference. In dynamic flow classification, the dynamic behavior of the flow is monitored for a period of time and, based on this behavior, the class of the flow is decided upon. In this case, the dynamic flow behavior can include such dynamic characteristics as interval time between packets, frequency of packets and size of packets being sent within the particular flow. Thus, dynamic flow classification does not depend on the accuracy of the static patterns in packet headers, and it can adjust its classification decision in relation to the time variations of the flow.

Generally, using dynamic flow classification can more closely track the behavior of a persistent and dynamically changing flow, and result in more accurate classification of the flow. It overcomes most of the limitations of the static technique described above. In particular, the dynamic flow classification technique, as disclosed within U.S. Pat. No. 6,023,456, can successfully be utilized for flows with encrypted packets; flows with non-standard layer headers and/or ports; and flows that change in behavior during transmission.

Unfortunately, dynamic flow classification is unavailable for the earlier packets of a flow and instead defaults to a predetermined initial classification. After this initial selection of a default classification, the classification of the flow is modified until the assigned flow classification matches the behavior of the flow being observed. This convergence between the assigned flow classification and the observed behavior can take a significant number of packets and/or period of time and, during this transitory period, the temporary flow classifications will likely be inaccurate. This initial inaccuracy in the selection of a flow classification can cause significant inefficiencies and make the use of the dynamic flow classification technique unable to work for short flows.

To overcome the disadvantages of both the static and dynamic flow classification techniques, a further technique for classifying packet flows has been proposed which combines the two techniques. This combined technique is disclosed within U.S. patent application Ser. No. 09/571,160 entitled "Apparatus and Method for Classifying Packet Flows" by Cao et al, filed on May 16, 2000 and assigned to the assignee of the present invention, herein incorporated by reference. Within this application, a flow classification technique is disclosed which initially utilizes the static flow classification technique and subsequently switches to the dynamic flow classification technique when its accuracy can be ensured.

In traditional implementations for a flow classification system, when a new flow is identified, the static flow classification technique determines a class for the flow and attaches a flow classification indication to each of the packets of that flow based upon this initial determination. Subsequently, when the first packet of the flow is received at a channel selection device, the channel for all of the packets of the flow is determined based upon the flow classification indication attached to the first packet of the flow.

With the use of a dynamic flow classification 30 system or a combined static/dynamic flow classification system, the first packet of the flow may have a different flow classification indication than other packets within the flow. As described above, in the case of a dynamic slow classification system, the first packet of the flow is labeled with a default classification while subsequent packets may be labeled with more accurate flow classification indications for the packet flow as determined based upon dynamic characteristics of the flow. Further, if the classification of a flow changes during the transmission of a flow, the flow classification indication within the first packet may not be accurate for the remaining packets of the packet flow, hence resulting in modifications with respect to the flow classification indication attached to the subsequent packets of the flow.

Figure 2:
FIG. 2 is a state diagram illustrating a sample implementation for a dynamic flow classification procedure.

One example of this dynamic change of flow classifications for packet flows is illustrated in FIG. 2. In this illustrated case, the initial packets of an email message are labeled as a Class 2 or 3 flow, subsequent packets of the same flow are labeled as a Class 4 flow during the transmission of a large data item such as web graphics and/or an email attachment and finally yet further packets of the flow are yet again labeled as a Class 2 or 3 flow after the completion of the large data item's transmission.

A channel assignment system according to a sample implementation of the present invention will now be described with reference to the logical block diagram of FIG. 3 and the flow chart of FIG. 4. Within FIG. 3, the channel assignment system comprises a computing apparatus 20 that comprises a Flow Class Reader (FCR) and Channel Assignment Logic (CAL) and a channel specification database 22 coupled to the computing apparatus 20. It should be recognized that, although h the FCR and CAL are illustrated as being implemented within a single computing apparatus and the channel specification database 22 is illustrated as a separate device, this should not limit the scope of the present invention. In particular, the FCR, the CAL and the channel specification database could all be combined within a single computing apparatus or alternatively be implemented within a plurality of devices.

Figure 3:
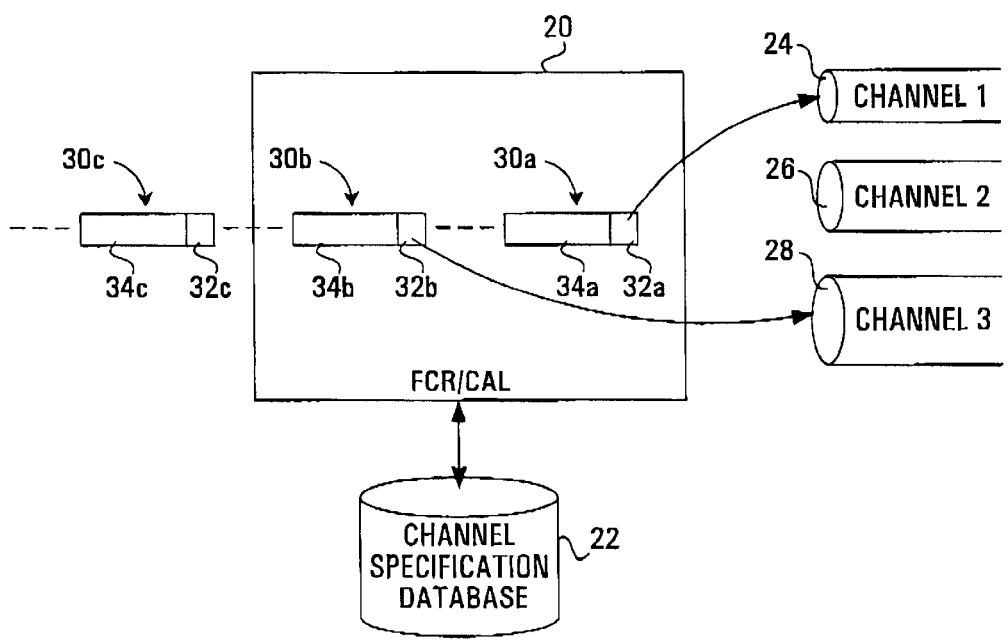
FIG. 3 is a logical block diagram of a dynamic channel assignment system according to a preferred embodiment of the present invention.

In the sample implementation of FIG. 3, there are three potential channels for the channel assignment system to choose from, those being illustrated by cylinders 24,26,28, labeled as Channel 1, Channel 2 and Channel 3 respectively. As pictorially depicted in FIG. 3 by the cylinders, respective diameters, Channel 1, Channel 2 and Channel 3 are of different channel speeds in kbps with Channel 1 having the lowest channel speed (smallest bandwidth) and Channel 3 having the fastest channel speed (largest bandwidth).

It should be recognized that, although the implementation being described with reference to FIG. 3 only has three channels of varying speeds, in reality, more channels with an increased variety of channel speeds could be among the channels to be selected. Further, in some simple scenarios only two channels and/or channels of only two channel speeds could be made available for an incoming packet flow.

It should further be recognized that the channels 24,26,28 could be communication channels implemented in one or more different carrier technologies from fiber optic cables to wireless data channels. As will be described herein below, the embodiments of the present invention have particular significant benefits when considering the assignment of wireless data channels due to the limited resources available in a wireless environment.

As illustrated in the channel assignment system of FIG. 3, there are a plurality of incoming packets 30a,30b,30c being received at the computing apparatus 20. Within FIG. 3, all of the packets 30a,30b,30c are packets within a single packet flow and each of these packets 30a,30b,30c comprise a respective overhead section 32a,32b,32c and a respective payload section 34a,34b,34c. The overhead section within each of these packets includes, among other things, a flow identification that is unique for each flow and a flow classification indication that indicates the flow classification that has been assigned to the flow.

As described above, the classification for the flow may be dynamically adjusted during the transmission of the flow when using a dynamic flow classification technique or a combination static/dynamic flow classification technique and thus, the flow classification indications within the individual packets 30a,30b,30c of the flow may vary. It is noted that, generally, the change in flow classification indications within the packets will not take place every packet but rather after a group of packets have been transmitted that adjusts the decision with regards to the class of flow that is being transmitted, this decision being based upon the dynamic characteristics of the packets as a whole.

In operation, the FCR within the computing apparatus 20 receives each of the packets within a flow, reads the flow identification and the flow classification indication attached to each of the packets and determines if a channel has yet been assigned for the particular packet flow and, if so, if the flow classification indication within the received packet has changed from the previously received packet of the same flow. If either no channel has yet been assigned for the particular flow or if the flow classification indication has changed from the indication within the previous packet of the same flow, the FCR within the computing apparatus 20 subsequently accesses the channel specification database 22 to determine a channel specification, including such parameters as channel bandwidth, that is desired for the particular packet flow. This channel specification is then preferably utilized by the CAL within the computing apparatus 20, along with other known information such as the current usage of each of the available channels, in order to select an appropriate channel for the packet flow to traverse.

One sample implementation of the channel specification database is illustrated below within Table 1:

TABLE 1

| Class | Minimum (kbps) | Maximum (kbps) |
|---|---|---|
| Class 1 | 9.6 | 38 |
| Class 2 | 38 | 64 |
| Class 3 | 64 | 144 |
| Class 4 | 1 | 384 |

Figure 1B:
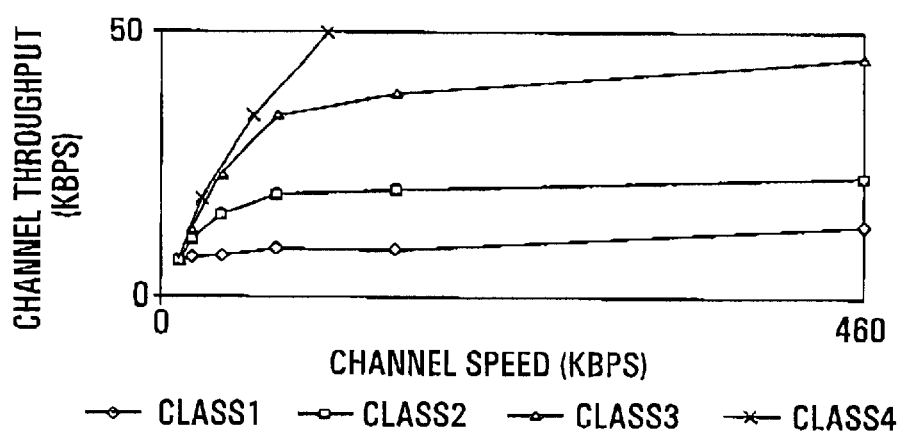
FIG. 1B is a graph that illustrates channel speed compared to channel throughput for a variety of flow classifications.

In this sample implementation, the channel specification database 22 contains an entry for each class of a packet flow, in this case Class 1, Class 2, Class 3 and Class 4 similar to those classes described above with reference to FIGS. 1A, 1B and 2. As depicted, each entry within Table 1 contains two elements that preferably will limit the channel that is assigned to a packet flow on the basis of its detected class. The first element is the minimum channel bandwidth that should be afforded to the class, below which the performance of the user application degrades significantly. The second element is the maximum bandwidth, beyond which the performance such as channel throughput increases very slowly compared to the increase in channel bandwidth and the channel utilization percentage declines quickly.

It should be noted that the values included within Table 1 are only included for example, in this case a particular example for Transmission Control Protocol (TCP) flows. It should further be understood that the channel specification database 22 could include other information.

For example, in other embodiments, other parameters such as the current availability of channel resources, policy priority and/or the necessary conditions for downgrading channel assignments can be practically applied during specific situations to set the minimum and maximum bandwidths. In yet other embodiments, other attributes of the channels could be recorded within the channel specification database 22 such as the total delay of the channel and its error rate.

One specific implementation of the present invention will now be described with reference to the flow chart of FIG. 4. In this flow chart, the steps are performed by one of the PCR and the CAL described above. Initially, when the PCR detects a new flow identification within a packet, hence detecting the first packet of a flow, the PCR reads at step 50 the flow classification indication attached to the packet. Next, as depicted at step 52, a look-up of a channel specification corresponding to the read flow classification indication is performed within the channel specification database 22, the channel specification preferably including a minimum and maximum channel bandwidth required for efficient transmission of the packet flow.

Based upon the channel specification that is determined within the channel specification database 22, the CAL assigns a channel to the particular packet flow at step 54. When referring to the system of FIG. 3, the CAL would assign the packet flow to one of Channel 1, Channel 2 or Channel 3 depending upon the required bandwidth requirements.

Next, within the procedure of assigning channels to packet flows, it is determined at step 56 whether an additional packet of a flow previously assigned to a channel has arrived at the PCR. If an additional packet of a particular flow does not arrive before a predetermined end-of-flow condition is met, the PCR declares the flow to be terminated and the channel resources assigned to the particular flow are de-assigned. An end-of-flow condition in one example comprises a timer that, when expired, indicates that no further packets of the particular flow are forthcoming.

When an additional packet for a known packet flow arrives at the computing apparatus 20 at step 56, the PCR reads the flow classification indication of the new packet at step 60 and determines at step 62 whether the flow classification has changed since the last packet of the particular flow. If the flow classification indication is the same as the previous packet of the flow, the procedure being performed by the PCR returns to step 56 and waits for another packet from the flow or for the end-of-flow condition to be met.

If, at step 62, the flow classification indication of the newly arrived packet is different than the indication within the previous packet of the same flow, the PCR proceeds at step 64 to look-up the new flow classification within the channel specification database 22 in order to find the new flow classification's channel specification.

At this point, the CAL determines at step 66 whether the particular packet flow requires re-assigning based upon a modified channel specification for the flow. It is noted that there are potential instances in which a change in classification for the flow does not necessary result in a need to change the channel of transmission. This for instance can occur if the channel specification for new and old flow classifications are similar in scope or if another parameter, such as limited channel resources, does not allow for the change of channels to occur.

If the packet flow does not require re-assigning of its channel, the PCR returns to step 56 and waits for another packet from the flow or the end-of-flow condition to be met. If the packet flow does require re-assigning, the CAL proceeds to assign a new channel to the particular flow based upon the new channel specification as depicted at step 68. FIG. 3 illustrates a case in which the channel assignment for a flow is dynamically re-assigned. In this case packet 30a is directed to Channel 1 while the packet 30b subsequently received at the computing apparatus 20 results in the flow being re-assigned to Channel 3, presumably due to a change within the flow's classification indication.

It should be noted that the dynamic channel assignment of the present invention is feasible because the change in class for a detected flow is not overly frequent and, thus, the time during which a flow remains within a single flow class is much longer compared to the time taken to re-assign a flow to a new channel. In the case that an increased number of flow classification changes take place for a packet flow, the present invention could still operate but would likely result in additional overhead leading to increased channel bandwidth wastage as well as increased requirements for computing power in order to perform the channel assignment changes. In such cases, preferably additional policy rules would be applied to restrict the number of channel assignment changes and therefore reduce the associated costs.

It should further be noted that in the case that the channel assignment for a flow is adjusted during the transmission of the flow, it is possible that the packets could be received out of order at the receiver due to different packets being transmitted at different speeds. In this case, a well-known re-ordering algorithm can be used to return the packets to their proper order.

Figure 5A:
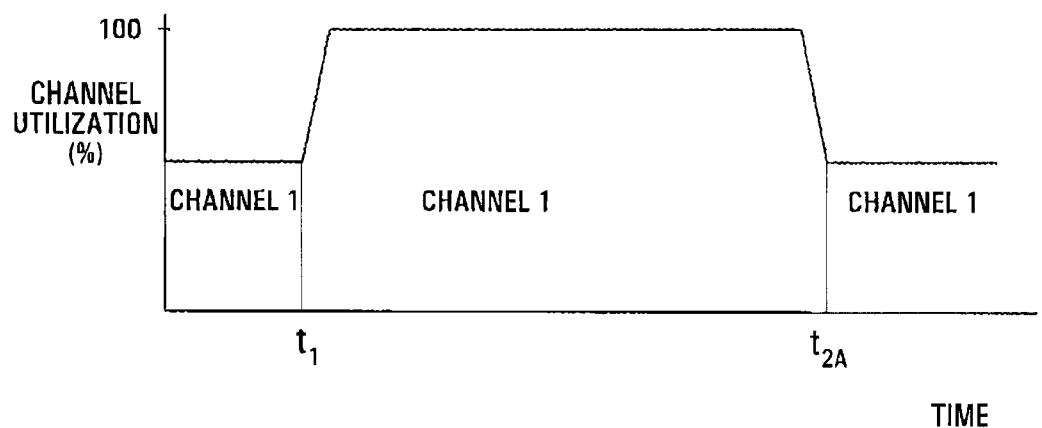
FIGS. 5A and 5B are graphical depictions of channel utilization during a first sample implementation using a well-known channel assignment technique and using a dynamic channel assignment technique according to a preferred embodiment of the present invention, respectively.
Figure 5B:
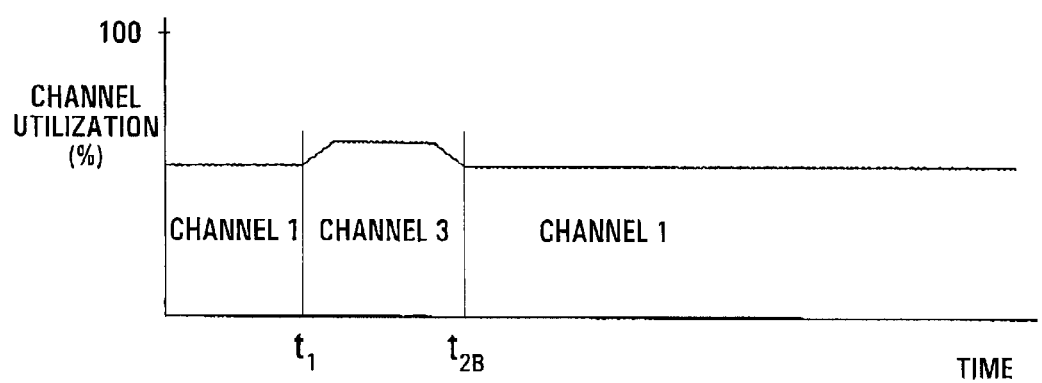

A couple of examples are now described with reference to FIGS. 5A, 5B, 6A and 68 to emphasize the benefits gained with the implementation of the present invention. FIGS. 5A and 5B are graphical depictions of channel utilization during a first sample implementation using a well-known channel assignment technique and using a dynamic channel assignment technique according to an embodiment of the present invention, respectively. Within both FIGS. 5A and 5B, the horizontal axis represents time while the vertical axis represents channel utilization in percent. In both of these cases illustrated, a packet flow identified as a Class 1 flow is being transmitted through Channel 1 until time $t_1$. At this time, the characteristics of the packet flow change to those of a Class 3 flow which has higher bandwidth requirements. As described previously, this change in class behavior for the packet flow could possibly be caused by one of a number of reasons including having an email attachment or web graphic being transmitted within the packet flow.

Now, as depicted in FIG. 5A in which the assignment of channels is static, the utilization of Channel 1 quickly increases to 100% as the data being sent per second is maximized. This results in the data that requires the higher bandwidth to be transmitted at this 100% utilization state until time $t_{2A}$, at which point the behaviour of the packet flow returns to that of a Class 1 flow. This reduction in required bandwidth as can be seen on FIG. 5A allows the utilization percentage to be decreased to approximately equal to the utilization level prior to the transmitting of the high bandwidth data.

Figure 4:
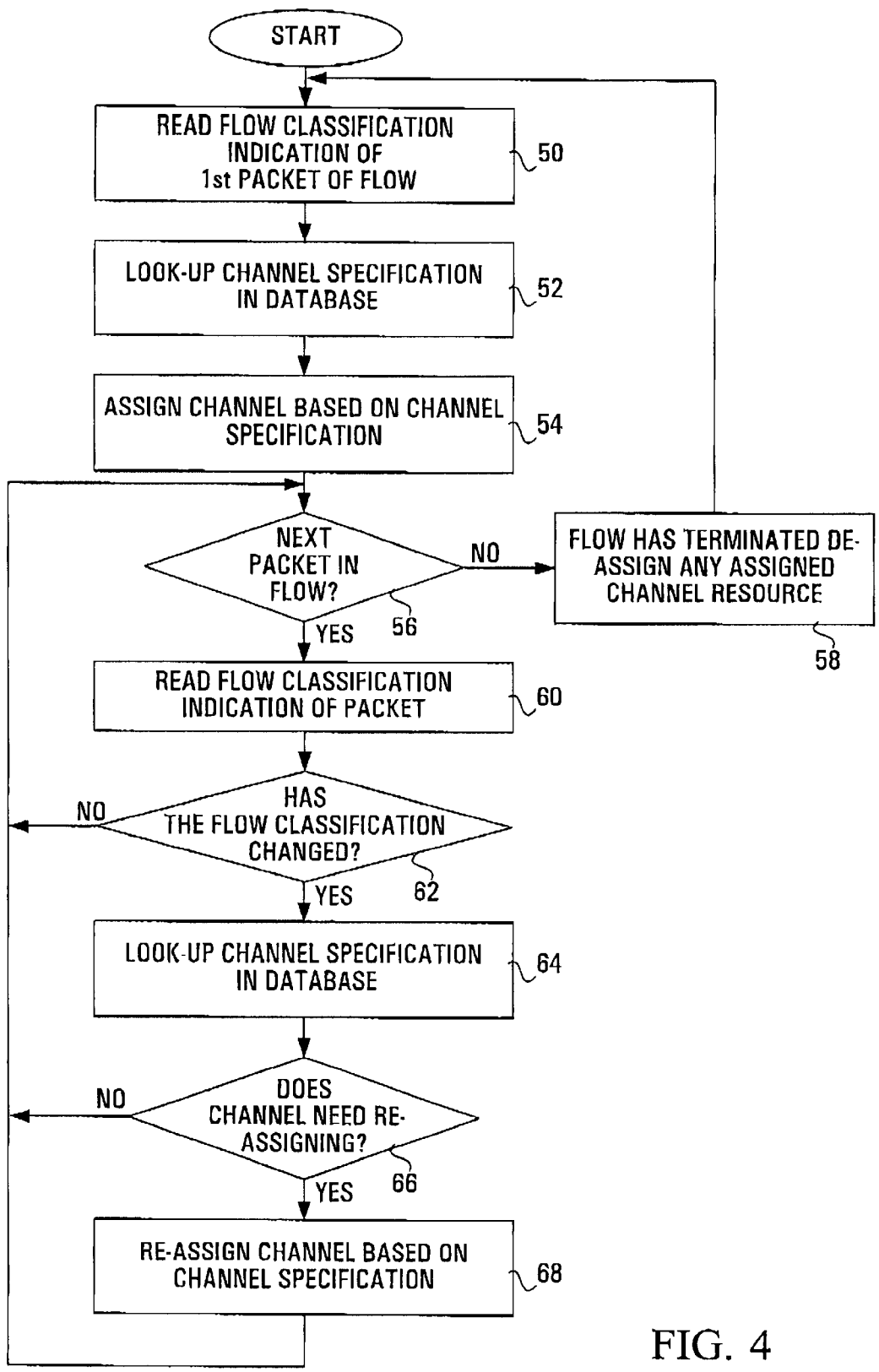
FIG. 4 is a flow chart illustrating the steps for dynamic channel assignment of a packet flow according to a preferred embodiments of the present invention.

Within FIG. 5B, as the behaviour of the packet flow is adjusted due to higher bandwidth data being transmitted at time $t_1$, the flow classification indications attached to the packets are also dynamically changed, thus resulting in a change in the assigned channel for the flow with use of the procedure depicted in FIG. 4. In this case, the channel for the packet flow is changed to Channel 3 at approximately time ti. Unlike the occurrence illustrated in FIG. 5A, the channel utilization after the change in channels is not maximized to its limit. As depicted in FIG. 5B, the high bandwidth data being transmitted continues until time $t_{2B}$ which is much earlier than time $t_{2A}$ illustrated in FIG. 5A. This reduction in time for transmitting the high bandwidth data is a direct result of using a higher bandwidth channel to compensate for higher bandwidth data that is to be transmitted.

In an alternative sample implementation to that illustrated in FIGS. 5A and 5B, the channel utilization in the time prior to time $t_1$ could be close to 100%. In this case, the channel utilization would not be significantly affected when the higher bandwidth data begins to be transmitted at time $t_{2B}$, but the speed of transmission of the higher bandwidth data using Channel 3 illustrated in FIG. 5B would still be significantly less than the speed of transmission continuing to use Channel 1 as illustrated in FIG. 5A.

Figure 6A:
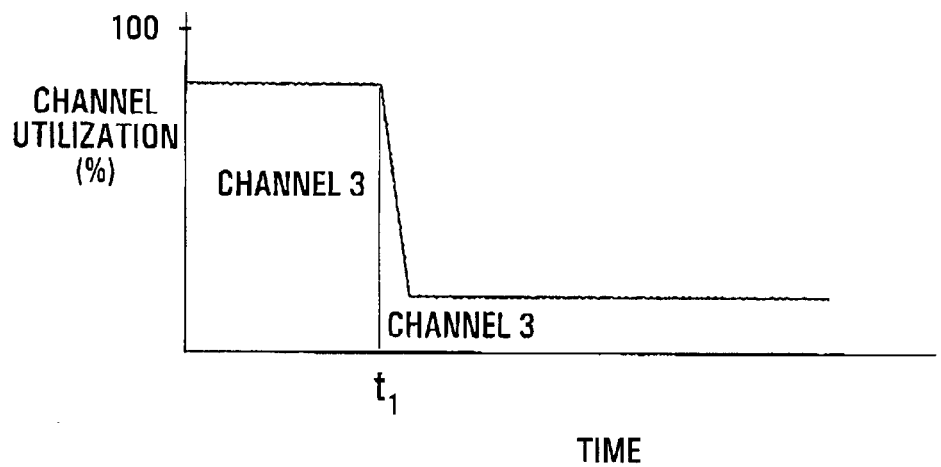
FIGS. 6A and 6B are graphical depictions of channel utilization during a second sample implementation using a well-known channel assignment technique and using a dynamic channel assignment technique according to a preferred embodiment of the present invention, respectively.
Figure 6B:
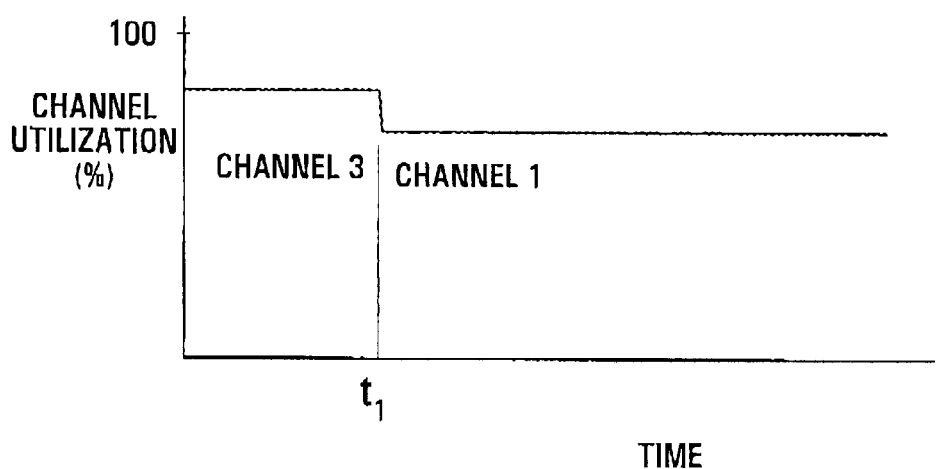

FIGS. 6A and 6B are graphical depictions of channel utilization during a second sample implementation using a well-known channel assignment technique and using a dynamic channel assignment technique according to an embodiment of the present invention, respectively. Similar to both FIGS. 5A and 5B, within both FIGS. 6A and 6B, the horizontal axis represents time while the vertical axis represents channel utilization in percent. In this case, as depicted in both figures, the packet flow initially is assigned to Channel 3 due to high bandwidth data that must be transmitted. Subsequently, at time $t_1$, the behaviour of the flow changes and the required bandwidth for the data decreases significantly.

As illustrated in FIG. 6A, in traditional implementations of static channel assignment, the assigned channel for the flow would remain as Channel 3 and simply the utilization of the channel would be significantly decreased to the point of being extremely inefficient. On the other hand, in the case of dynamic channel assignment, according to the present invention, the change in behaviour in the packet flow would result in a change in the flow classification indications within the packets of the flow which would in turn result in a modification of the channel utilized for the particular flow.

There are numerous advantages of the present invention compared to well-known implementations of channel assignment algorithms for packet flows. Essentially, embodiments of the present invention are designed to minimize waste with regard to channel resources and, at the same time, maximize the performance available to a user's application(s). With use of the present invention, high bandwidth channels are preferably only used during times in which they are necessary to meet application performance requirements and not for lower bandwidth data that could equally benefit from a lower bandwidth channel. For the majority of packet flow transmissions, a smaller bandwidth channel (i.e., Channel 1 in the illustration of FIG. 3) could be used to carry the packet flow, thus preserving the higher bandwidth channel(s).

Although the embodiments of the present invention described herein above are described generally applicable to the channel assignment of packet flow to one of a plurality of transmission channels, the advantages of the present invention are particularly important when considering the channel assignment of Transmission Control Protocol (TCP) flows to one of a plurality of wireless transmission channels. Different classes of TCP based application flows are used by a variety of applications. The effectiveness of each class of TCP flow in utilizing a particular channel relates to the delay and bit rate of that channel due to the inner workings of the TCP protocol. The channel assignment algorithm described herein above for embodiments of the present invention allow for the dynamic assignment of optimally matched channels for a flow as its classification is changed over time.

The particular applicability of embodiments of the present invention to wireless applications occurs for a number of reasons. For one, the long delays of wireless radio channels magnify the difference in the effective utilization of a channel by different classes of TCP flows. With the dynamic channel assignment technique according to embodiments of the present invention, the least channel resources are expended for the correct TCP flow at the correct time. Further, it allows higher speed channels to be preserved while still maximizing application performance that can be achieved for a particular flow.

Although the FCR and CAL as described above for the present invention read the flow classification indication of each packet within a particular flow, it should be understood that this is not meant to limit the present invention. For instance, in alternative embodiments, the PCR could simply read every periodic packet, the period possibly being fixed, dynamically changing or even random. The CAL in these alternatives would preferably operate for each read flow classification indication, though one should understand that this too is not meant to limit the present invention.

Persons skilled in the art will appreciate that there are yet more alternative implementations and modifications possible for implementing the present invention, and that the above implementations are only illustrations of certain embodiments of the invention. The scope of the invention, therefore, is only to be limited by the claims appended hereto.

We claim:

1. A computing apparatus arranged to receive a flow of packets, a plurality of the packets having a corresponding flow classification indication, the computing apparatus comprising:

a flow classification reader that operates to determine a first flow classification indication associated with a first packet of the flow and at least one subsequent flow classification indication associated with a subsequent packet of the flow; and channel assignment logic that operates to assign the flow to a first one of a plurality of channels with use of the first flow classification indication, to determine if a change channel test is passed with use of the subsequent flow classification indication and to re-assign the flow to a second one of the plurality of channels with use of the subsequent flow classification indication if the change channel test is passed.

2. A computing apparatus according to claim 1, wherein the channel assignment logic operates to determine if a change channel test is passed by determining if the at least one subsequent flow classification indication is different than the first flow classification indication; and, if the at least one subsequent flow classification indication is different from the first flow classification indication, determining that the change channel test is passed.

3. A computing apparatus according to claim 1 further comprising a look-up database that lists a plurality of channel specifications that correspond to respective flow classification indications; and wherein the channel assignment logic operates to assign the flow to a first one of the plurality of channels by determining a first channel specification that corresponds to the first flow classification indication with use of the look-up database and assigning the flow to a channel that achieves the first channel specification.

4. A computing apparatus according to claim 3, wherein the channel assignment logic operates to re-assign the flow to a second one of the plurality of channels by determining a second channel specification that corresponds to the at least one subsequent flow classification indication with use of the look-up database and reassigning the flow to a channel that achieves the second channel specification.

5. A computing apparatus according to claim 3, wherein the channel assignment logic operates to determine if a change channel test is passed by determining if the at least one subsequent flow classification indication is different than the first flow classification indication; if the at least one subsequent flow classification indication is different from the first flow classification indication, determining a second channel specification that corresponds to the at least one subsequent flow classification indication with use of the look-up database; and, if the first channel does not achieve the second channel specification, determining that the change channel test is passed.

6. A computing apparatus according to claim 5, wherein the channel assignment logic operates to re-assign the flow to a second one of the plurality of channels by re-assigning the flow to a channel that achieves the second channel specification.

7. A computing apparatus according to claim 3, wherein the channel assignment logic operates to determine if a change channel test is passed by determining if the at least one subsequent flow classification indication is different than the first flow classification indication; if the at least one subsequent flow classification indication is different from the first flow classification indication, determining a second channel specification that corresponds to the at least one subsequent flow classification indication with use of the look-up database; and, if the first channel does not achieve the second channel specification and a second channel availability test is passed, determining that the change channel test is passed.

8. A computing apparatus according to claim 1, wherein the packets within the flow are Transmission Control Protocol (TCP) packets.

9. A computing apparatus arranged to receive a flow of packets, each of the packets having a corresponding flow classification indication, the computing apparatus comprising:

a flow classification reader that operates to determine a first flow classification indication associated with a first packet of the flow and subsequent flow classification indications associated with subsequent packets of the flow; and channel assignment logic that operates to assign the flow to a first one of a plurality of channels with use of the first flow classification indication, to determine if a change channel test is passed with use of the subsequent flow classification indications and to re-assign the flow to a second one of the plurality of channels with use of the subsequent flow classification indications if the change channel test is passed.

10. A computing apparatus according to claim 9 further comprising a look-up database that lists a plurality of channel specifications that correspond to respective flow classification indications; and wherein the channel assignment logic operates to assign the flow to a first one of the plurality of channels by determining a first channel specification that corresponds to the first flow classification indication with use of the look-up database and assigning the flow to a channel that achieves the first channel specification.

11. A computing apparatus according to claim 10, wherein the channel assignment logic operates to determine if a change channel test is passed by determining if any of the subsequent flow classification indications are different than the first flow classification indication; if any of the subsequent flow classification indications are different from the first flow classification indication, determining a second channel specification that corresponds to the particular subsequent flow classification indication with use of the look-up database; and, if the first channel does not achieve the second channel specification, determining that the change channel test is passed; and wherein the channel assignment logic operates to re-assign the flow to a second one of the plurality of channels by re-assigning the flow to a channel that achieves the second channel specification.

12. A packet transmission system arranged to receive a flow of packets, a plurality of the packets having a corresponding flow classification indication, the transmission system comprising:

a plurality of transmission channels;

a flow classification reader that operates to determine a first flow classification indication associated with a first packet of the flow and at least one subsequent flow classification indication associated with a subsequent packet of the flow; and channel assignment logic that operates to assign the flow to a fast one of the plurality of transmission channels with use of the first flow classification indication, to determine if a change channel test is passed with use of the subsequent flow classification indication and to re-assign the flow to a second one of the plurality of transmission channels with use of the subsequent flow classification indication if the change channel test is passed.

13. A system according to claim 12, wherein the plurality of transmission channels are wireless communication channels.

14. A method for dynamically assigning a flow of packets to one of a plurality of channels, a plurality of the packets having corresponding flow classification indications, the method comprising:

reading a first flow classification indication associated with a first packet of the flow;

assigning the flow to a first one of the plurality of channels with use of the first flow classification indication;

reading subsequent flow classification indications associated with subsequent packets of the flow;

determining if the assigned first channel for the flow needs to be changed with use of the subsequent flow classification indications; and if the assigned first channel for the flow needs to be changed, re-assigning the flow to a second one of the plurality of channels with use of the subsequent flow classification indications.

15. A method according to claim 14, wherein the reading the first flow classification indication and the subsequent flow classification indications comprises monitoring overhead portions of the individual packets of the flow.

16. A method according to claim 14, wherein the assigning the flow to a first one of the plurality of channels comprises determining a first channel specification that corresponds to the first flow classification indication and assigning the flow to a channel that achieves the first channel specification; and wherein the re-assigning the flow to a second one of the plurality of channels comprises determining a second channel specification that corresponds to the at least one subsequent flow classification indication and re-assigning the flow to a channel that achieves the second channel specification.

17. A method according to claim 14, wherein the determining if the assigned channel for the flow needs to be changed comprises determining if any of the subsequent flow classification indications correspond to a second flow classification indication that is different than the first flow classification indication; and wherein, if the assigned first channel for the flow needs to be changed, the re-assigning the flow to a second one of the plurality of channels is done with use of the second flow classification indication.

18. A method according to claim 14, wherein the assigning the flow to a first one of the plurality of channels comprises determining a first channel specification that corresponds to the first flow classification indication and assigning the flow to a channel that achieves the first channel specification;

wherein the determining if the assigned channel for the flow needs to be changed comprises determining if any of the subsequent flow classification indications correspond to a second flow classification indication that is different than the first flow classification indication; if any of the subsequent flow classification indications correspond to the second flow classification indication, determining a second channel specification that corresponds to the at least one subsequent flow classification indication; and determining if the first channel achieves the second channel specification, the assigned first channel for the flow needing to be changed if the first channel does not achieve the second channel specification.

19. A computer readable memory arranged to store a channel assignment software that can be run on a computing apparatus that receives a flow of packets, a plurality of the packets having corresponding flow classification indications, the channel assignment software when running on the computing apparatus operating to:

read a first flow classification indication associated with a first packet of the flow;

assign the flow to a first one of a plurality of channels with use of the first flow classification indication;

read subsequent flow classification indications associated with subsequent packets of the flow;

determine if the assigned first channel for the flow should be changed with use of the subsequent flow classification indications; and if the assigned first channel for the flow should be changed, re-assign the flow to a second one of the plurality of channels with use of the subsequent flow classification indications.

20. A computing apparatus arranged to receive a flow of packets, a plurality of the packets having a corresponding flow classification indication, the computing apparatus comprising:

a flow classification reader that operates to determine a first flow classification indication associated with a first packet of the flow and at least one subsequent flow classification indication associated with a subsequent packet of the flow; and channel assignment logic that operates to assign the flow to a first one of a plurality of channels, each channel of the plurality of channels having a different bandwidth, with use of the first flow classification indication, to determine if a change channel test is passed with use of the subsequent flow classification indication and to reassign the flow to a second one of the plurality of channels with use of the subsequent flow classification indication if the change channel test is passed.

21. A computing apparatus according to claim 20, wherein the channel assignment logic operates to determine if a change channel test is passed by determining if the at least one subsequent flow classification indication is different than the first flow classification indication; and, if the at least one subsequent flow classification indication is different from the first flow classification indication, determining that the change channel test is passed.

22. A computing apparatus according to claim 20 further comprising a look-up database that lists a plurality of channel specifications that correspond to respective flow classification indications; and wherein the channel assignment logic operates to assign the flow to a first one of the plurality of channels by determining a first channel specification that corresponds to the first flow classification indication with use of the look-up database and assigning the flow to a channel that achieves the first channel specification.

23. A computing apparatus arranged to receive a flow of packets, each of the packets having a corresponding flow classification indication, the computing apparatus comprising:

a flow classification reader that operates to determine a first flow classification indication associated with a first packet of the flow and subsequent flow classification indications associated with subsequent packets of the flow; and channel assignment logic that operates to assign the flow to a first one of a plurality of channels, each channel of the plurality of channels having a different bandwidth, with use of the first flow classification indication, to determine if a change channel test is passe with use of the subsequent flow classification indications and to re-assign the flow to a second one of the plurality of channels with use of the subsequent flow classification indications if the change channel test is passed.

24. A computing apparatus according to claim 23 further comprising a look-up database that lists a plurality of channel specifications that correspond to respective flow classification indications; and wherein the channel assignment logic operates to assign the flow to a first one of the plurality of channels by determining a first channel specification that corresponds to the fist flow classification indication with use of the look-up database and assigning the flow to a channel that achieves the first channel specification.

25. A computing apparatus according to claim 24 wherein the channel assignment logic operates to determine if a change channel test is passed by determining if any of the subsequent flow classification indications are different than the first flow classification indication; if any of the subsequent flow classification indications are different from the first flow classification indication, determining a second channel specification that corresponds to the particular subsequent flow classification indication with use of the look-up database; and, if the first channel does not achieve the second channel specification, determining that the change channel test is passed; and wherein the channel assignment logic operates to re-assign the flow to a second one of the plurality of channels by re-assigning the flow to a channel that achieves the second channel specification.

26. A packet transmission system arranged to receive a flow of packets, a plurality of the packets having a corresponding flow classification indication, the transmission system comprising:

a plurality of transmission channels, each transmission channel of the plurality of transmission channels having a different bandwidth;

a flow classification reader that operates to determine a first flow classification indication associated with a first packet of the flow and at least one subsequent flow classification indication associated with a subsequent packet of the flow; and channel assignment logic that operates to assign the flow to a first one of the plurality of transmission channels with use of the first flow classification indication, to determine if a change channel test is passed with use of the subsequent flow classification indication and to re-assign the flow to a second one of the plurality of transmission channels with use of the subsequent flow classification indication if the change channel test is passed.

27. A method for dynamically assigning a flow of packets to one of a plurality of channels, a plurality of the packets having corresponding flow classification indications, the method comprising:

reading a first flow classification indication associated with a first packet of the flow;

assigning the flow to a first one of the plurality of channels, each channel of the plurality of channels having a different bandwidth, with use of the first flow classification indication;

reading subsequent flow classification indications associated with subsequent packets of the flow;

determining if the assigned first channel for the flow needs to be changed with use of the subsequent flow classification indications; and if the assigned first channel for the flow needs to be changed, re-assigning die flow to a second one of the plurality of channels with use of the subsequent flow classification indications.

28. A method according to claim 27, wherein the assigning the flow to a first one of the plurality of channels comprises determining a first channel specification that corresponds to die first flow classification indication and assigning the flow to a channel that achieves the first channel specification; and wherein the reassigning the flow to a second one of the plurality of channels comprises determining a second channel specification that corresponds to the at least one subsequent flow classification indication and re-assigning the flow to a channel that achieves the second channel specification.

29. A computer readable memory arranged to store a channel assignment software that can be ma on a computing apparatus that receives a flow of packets, a plurality of the packets having corresponding flow classification indications, the channel assignment software when running on the computing apparatus operating to:

read a first flow classification indication associated with a first packet of the flow;

assign the flow to a first one of a plurality of channels, each channel of the plurality of channels having a different bandwidth, with use of the first flow classification indication;

read subsequent flow classification indications associated with subsequent packets of the flow;

determine if the assigned first channel for the flow should be changed with use of the subsequent flow classification indications; and if the assigned first channel for the flow should be changed, re-assign the flow to a second one of the plurality of channels with use of the subsequent flow classification indications.

* * * * *

UNITED STATES PATENT AND TRADEMARK OFFICE
CERTIFICATE OF CORRECTION

PATENT NO. : 6,785,291 B1
DATED : August 31, 2004
INVENTOR(S) : Carl F. Cao et al.

It is certified that error appears in the above-identified patent and that said Letters Patent is hereby corrected as shown below:

Column 13,
Line 16, "...fast..." should be -- ...first... --.

Column 15,
Line 24, "...passe..." should be -- ...passed... --.
Line 36, "...fist..." should be -- ...first... --.

Column 16,
Lines 28 and 34, "...die..." should be -- ...the... --.
Line 45, "...ma..." should be -- ...run... --.

Signed and Sealed this

Twenty-fifth Day of October, 2005

JON W. DUDAS
*Director of the United States Patent and Trademark Office*